United States Patent [19]
Di Palma

[11] 3,984,052
[45] Oct. 5, 1976

[54] AUTOMATIC WATERING INSTALLATION

[76] Inventor: Hugo Roland Di Palma, Place Stalingrad, Fauillet-Tonneins (Lot et Garonne), France

[22] Filed: July 10, 1974

[21] Appl. No.: 486,995

[30] Foreign Application Priority Data
July 13, 1973 France .............................. 73.25845
Feb. 7, 1974 France .............................. 74.04129
July 4, 1974 France .............................. 74.23361

[52] U.S. Cl. ................................ 239/183; 137/344
[51] Int. Cl.² ..................... B05B 3/18; A01G 25/00; A01G 27/00
[58] Field of Search .......... 239/178, 183, 184, 212; 137/344

[56] References Cited
UNITED STATES PATENTS

| | | | |
|---|---|---|---|
| 3,444,941 | 5/1969 | Purtell | 239/183 X |
| 3,463,175 | 8/1969 | Rogers | 137/344 X |
| 3,575,200 | 4/1971 | Imeson | 137/344 |
| 3,592,220 | 7/1971 | Reinke | 239/212 X |
| 3,608,827 | 9/1971 | Kinkead | 239/184 |
| 3,679,135 | 7/1972 | Grosch | 239/183 |
| 3,710,818 | 1/1973 | Imeson | 137/344 |
| 3,729,016 | 4/1973 | Von Linsowe | 137/344 |

Primary Examiner—Evon C. Blunk
Assistant Examiner—Andres Kashnikow
Attorney, Agent, or Firm—Parmelee, Johnson & Bollinger

[57] ABSTRACT

The invention relates to a watering installation which works automatically, in which are provided, a movable carriage provided with at least a motor element, at least a front wheel and at least a nozzle for throwing the water and which is connected to a coupling device, as well as a stationary water circuit including a pipe provided with outlet mouths distributed along its length, the front wheel being provided with guide means ensuring its co-operation with the pipe, acting as a guide rail, while the carriage comprises a retractable abutment arranged in such a way as it co-operates with each outlet mouth for stopping the carriage, a contact means for co-operating with each outlet mouth being also provided for moving the connector or coupling device of the nozzle and coupling it with each outlet mouth.

27 Claims, 13 Drawing Figures

FIG.12

AUTOMATIC WATERING INSTALLATION

The invention relates to a watering installation which entirely works automatically.

The installation according to the invention is characterized in that it comprises a movable carriage provided with at least a motor element, at least a steering-wheel and with at least a nozzle for ejecting water, which is connected to a connector, as well as a stationary water circuit comprising a pipe provided with mouths distributed along its length, the steering-wheel being provided with means securing its co-operation with the pipe, which acts as a guide-rail, while the carriage comprises a retractable abutment arranged in such a way as it co-operates with each mouth for stopping the carriage, a contact means also co-operating with each mouth and which is also provided for removing the connector of the nozzle and connecting it with each mouth.

The invention is presented by way of non-limitative example in the attached drawings, wherein:

FIG. 12 is a perspective view of a mode of embodiment of the carriage according to the invention;

The installation according to the invention essentially comprises a watering carriage which moves automatically on the area to be watered, by following for this purpose the water feeding pipe of the said carriage which acts as a guide-rail.

Figure 7:
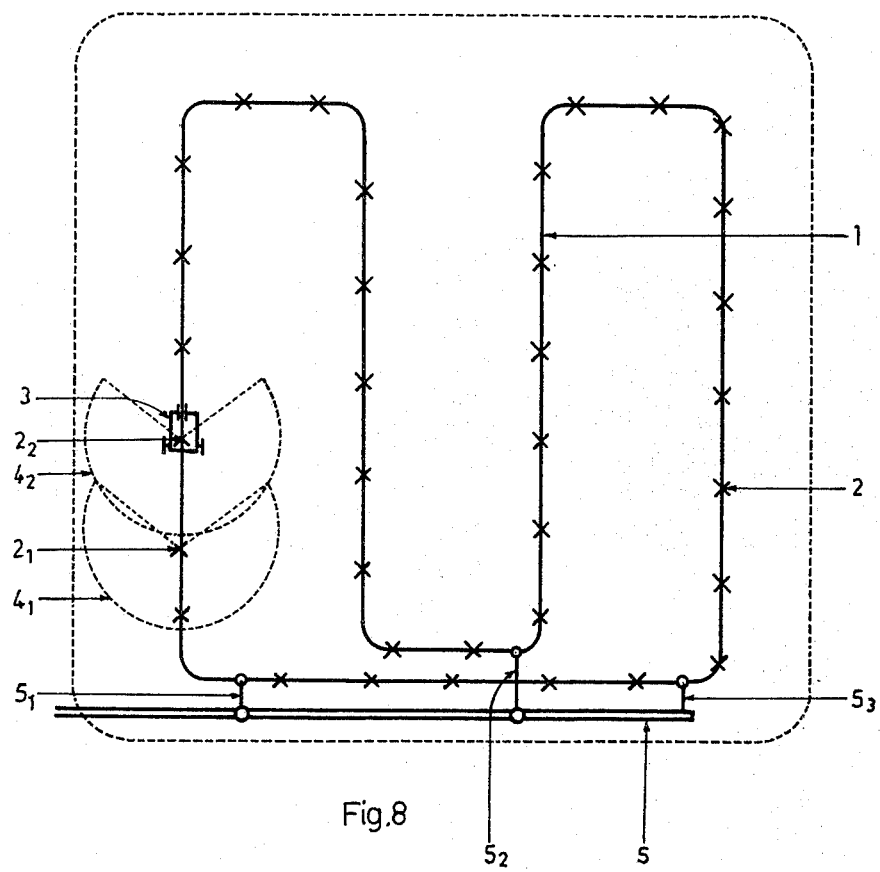
FIG. 7 is a diagrammatical view of an example of a water circuit installation for watering a field area.

To this end, as shown in FIG. 7 attached therein, the water circuit 1 comprises pipes arranged end-to-end so as to make a closed circuit and, thus, a guide-rail in close circuit along which the watering carriage can perform repeated watering cycles on a field area without necessitating the apparatus to be started again. Furthermore, as shown in FIG. 7 connected into the watering circuit at spaced points therein, the said water circuit comprises watering outlet mouths, diagramatically shown at 2, distributed along the length of pipe and onto which the carriage 3 is successively and automatically coupled or meshed so as to feed the device which secures watering of the surfaces $4_1$, $4_2$, etc. . . . with water. Thus, when the carriage 3 is coupled to the feeding mouth $2_1$, it performs watering of the surface area $4_1$, whilst when it is coupled to the mouth $2_2$ it performs watering of the surface area $4_2$, and so on.

As it can be seen in FIG. 7, the water circuit resting on the ground, and the length of which depends on both the shape and size of the ground to be watered, is fed with water from a main conduit 5. As discussed above, the water circuit 1 is a closed circuit, that is, it forms a closed loop, as seen in FIG. 7. The main supply conduit 5 is connected to the closed circuit 1 by a plurality of intermediate supply lines $5_1$, $5_2$ and $5_3$. Thus, water is fed from the main supply conduit 5 into the closed circuit 1 at a plurality of spaced points where these intermediate supply lines are connected to the closed circuit 1. Accordingly, at whatever outlet mouth 2 along the closed circuit 1 the watering carriage 3 may be located at any given time, this carriage can be supplied with water through the circuit 1. Moreover, the water can flow through the closed circuit 1 in both directions, i.e. from both sides of the closed loop, to any given outlet mouth 2. Consequently, for a given watering flow, the required cross sectional area of the pipe in the circuit 1 can be reduced to one-half.

Figure 1:
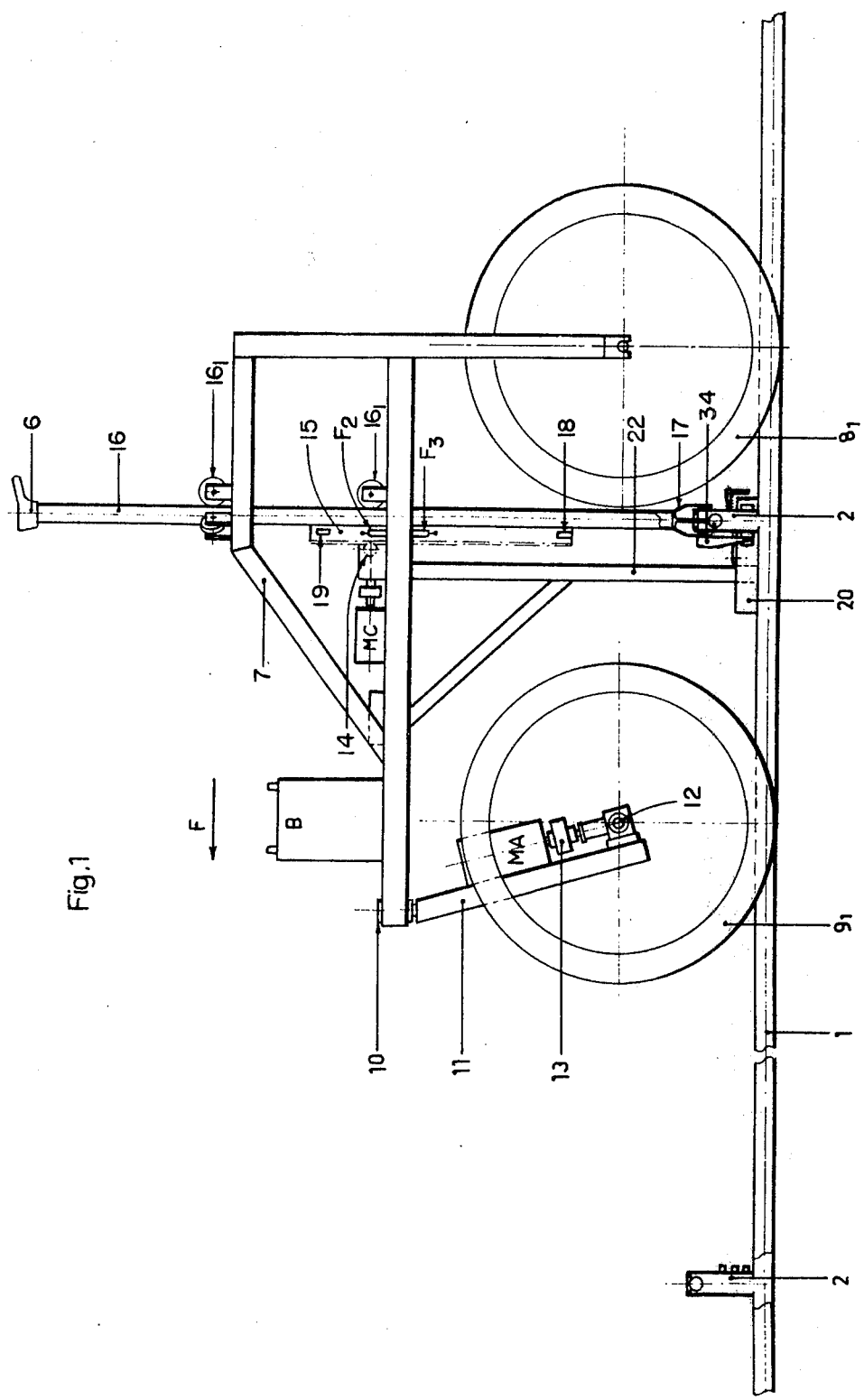
FIG. 1 is a diagrammatical lateral view of a mode of embodiment of the invention.
Figure 2:
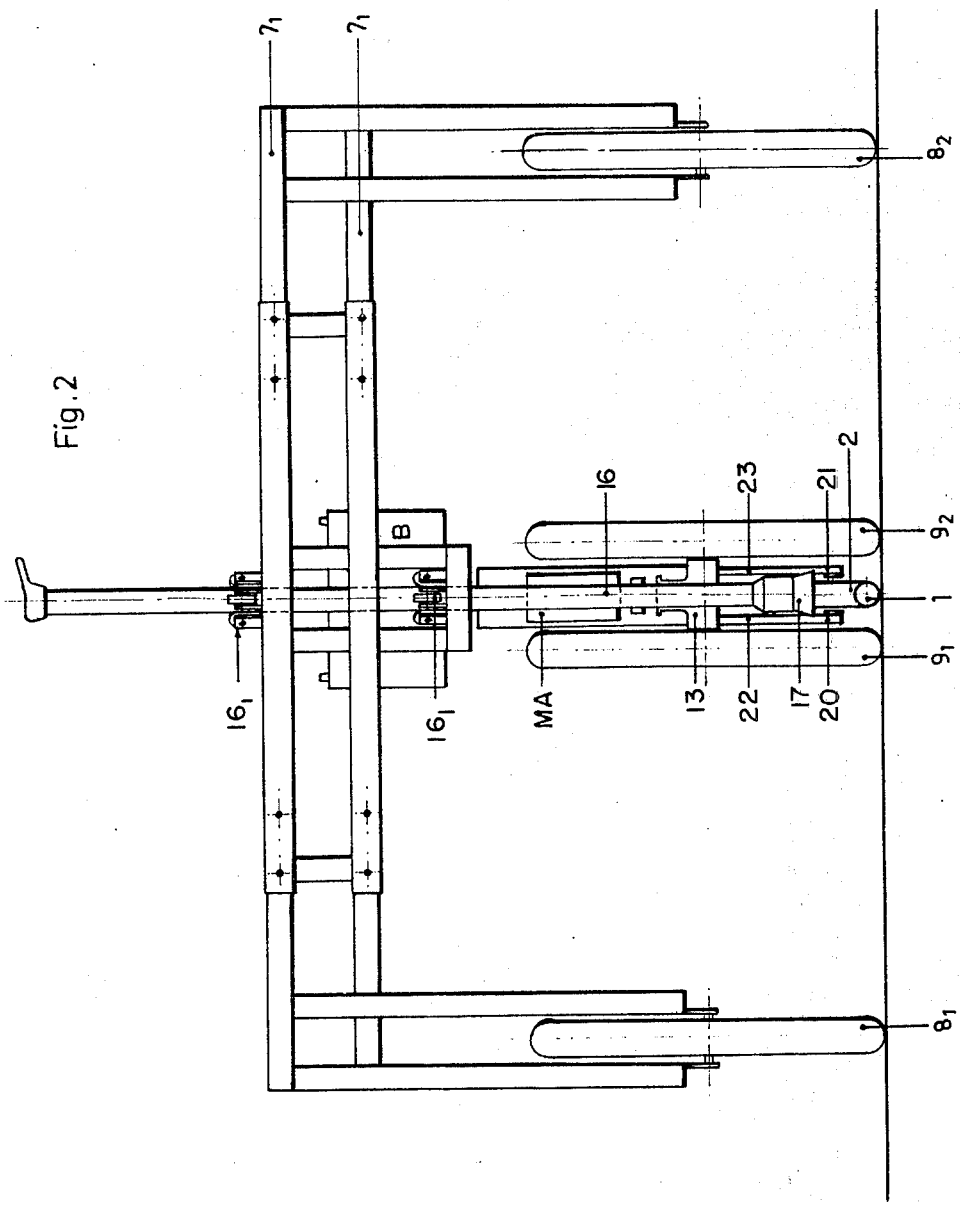
FIG. 2 is a right hand view of FIG. 1.

The carriage, which is successively meshed or coupled to the various mouths 2 of the pipe 1 thereby each time securing, through the jet 6 (FIG. 1), watering of the surface of a field, comprises a tubular framework 7 provided with two carrying wheels $8_1$ and $8_2$ (FIG. 2) and two steering-wheels $9_1$, $9_2$. The carrying wheels $8_1$, $8_2$ which are separated from each other, are connected to a portion of the framework $7_1$ which is adjustable in width and arranged at a level above than that of the wheels $8_1$ and $8_2$, in order to form a watering device which can overlap two consecutive rows of plants.

At the front part of the frame-work, an arm 11 (FIG. 1) is mounted pivoting at 10, on which the hub 12 of both wheels $9_1$ and $9_2$ is fitted. These two steering-wheels $9_1$ and $9_2$ also constitute the driving wheels of the carriage and are, to this end, set in motion by the electric motor MA, acting through a speed-reducing gear and a flexible coupling device 13. Said wheels $9_1$, $9_2$ are arranged parallel at a distance from each other slightly greater than the diameter of the pipe 1 which serves as a guide-rail for the wheels $9_1$, $9_2$ and, thus, for the carriage 3.

Also on the framework 7 a second electric motor MC is fitted, which is supplied as the motor MA by a battery B mounted on the said frame-work. This battery consists of a rechargeable battery, but can also be constituted by a solar battery.

Figure 8:
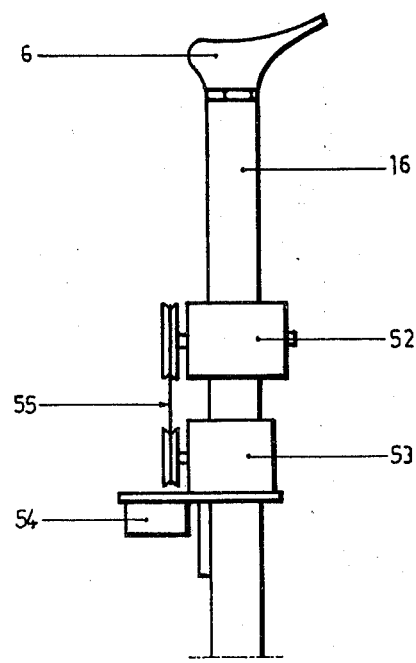
FIG. 8 shows the device for recharging the battery.

It will be noted that the driving motor MA only consumes energy during the time required for moving from one mouth 2 to another, and the consumption being relatively weak, the one and same battery can be used during several months and, particularly, throughout all of the hot period which requires watering. However, if desired, the said battery can be associated with a recharging device mounted onto the carriage (see FIG. 8) and comprising a turbine 52, an alternator 53 and a voltage regulator 54. The said turbine 52 being fitted on the nozzle 16 so as to be actuated by the watering water and itself driving the alternator 53 by means of the belt 55.

The motor MC, provided with a speed-reducing device and a flexible coupling, not shown in detail, comprises an outlet pinion 14 which meshes with a toothed-rack 15 fitted on the nozzle 16 which consists in the example shown of a rigid tube. This nozzle includes at its upper end the rotating watering jet 6, and at its lower end the coupling device 17 provided for coupling onto the mouths of the feeding pipe 1. The said nozzle 16 which is mounted vertical is guided during its travelling by sets of rollers $16_1$.

On the toothed-rack 15, two ramps 18 and 19 are provided, with which two end-of-course switches $F_3$ and $F_2$ (FIGS. 6 and 9) co-operate in order to ensure the automatic working of the carriage, as this will be subsequently described.

The electric motor MC, which is a reversible rotation motor, is intended for driving upwards and downwards the nozzle 16, the elevated position of the said nozzle corresponding to the travelling of the carriage from one water mouth to the following one, while the lower position corresponds to the connection of the connector 17 with a mouth 2 and, then, to watering of a zone surrounding the carriage.

Figure 4:
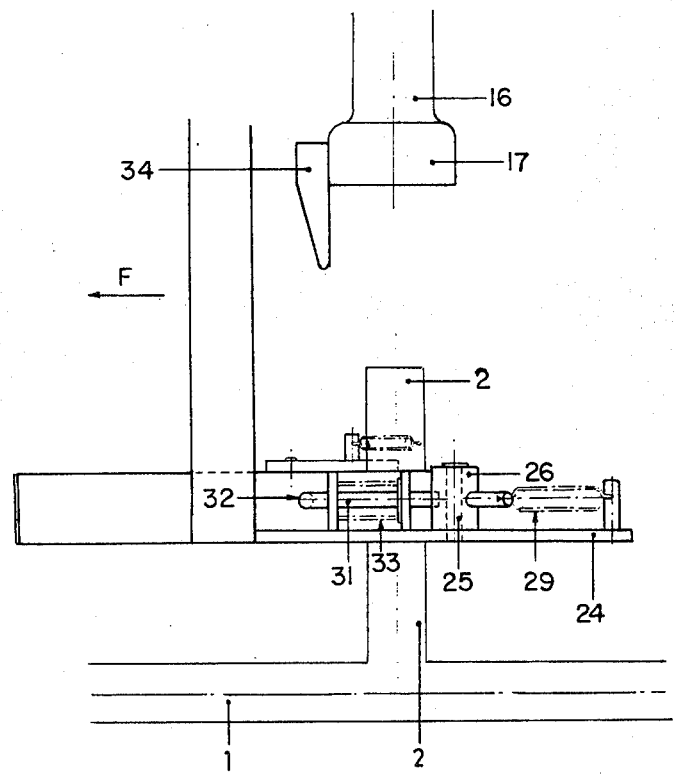
FIG. 4 is a view from above of FIG. 3.
Figure 3:
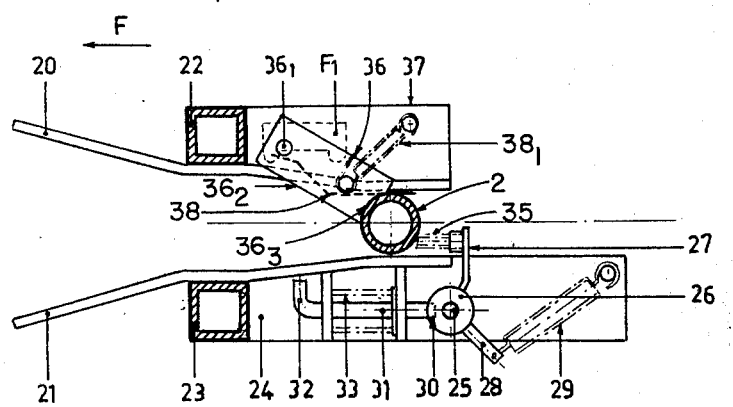
FIG. 3 is a cross-section view particularly showing from above the mechanism securing, locking and bolting of the carriage.

The mechanism ensuring the automatic stopping of the carriage at the location of a mouth 2, the coupling of the nozzle 16 with this mouth for perfoming watering, then the uncoupling of the carriage with respect to the mouth 2, and the separation of the nozzle from the said mouth, are represented in detail in FIGS. 3 and 4.

As it can first be noted, the carriage comprises two guiding elements 20 and 21 secured on the framework by means of two vertical sections 22 and 23. The guiding elements 20 and 21 form or define a guiding channel open at the front of the carriage, and are arranged at such a level above the ground as they meet with the mouths 2 so as to correctly adjust the carriage in order to bring the connector 17 into alignment with the axis of the said mouth.

On the section 23, there is a supporting plate 24 which receives at 25 a pivoting hub 26 provided with a paddle 27 the free end of which is located in the trajectory of the mouths 2 when the carriage 3 is travelling, that is to say, the paddle 27 is at the same level as that of the narrower portion of the channel formed by the guiding elements 20, 21.

On the hub 26 there is a projecting arm 28 to which a return-spring 29 is hooked, this spring also being attached to the plate 24.

This hub 26 includes a lateral aperture 30 inside which the end of a rod 31, bent at 32, is engageable, a coil-spring 33 co-operating for this purpose with the rod 31 so as to maintain its end engaged in the aperture 30.

It can also be seen in FIG. 4 that the coupling device 17 of the nozzle 16 includes a lateral wedge 34 which is positioned in such a way that, when the nozzle is brought down this wedge meshes with the bent end 32 of the rod 31, so as retract the end of the said rod outside of the aperture 30 in opposition to the spring 33.

It can also be seen in FIG. 3 that the end of the paddle 27 includes a flexible spring means 35 through which the said paddle 27, which acts as an abutment, receives in supporting relationship the mouth 2 involved.

Also, accross the channel formed by the two guiding elements 20 and 21, that is to say, on the trajectory followed by each mouth 2, in its relative travelling with respect to the movable carriage, a blade 36 is provided pivoting at $36_1$ on a supporting plate 37 secured to the section 22. Besides, between the plates 37 and 36 a spring 38, is interconnected, which works in a wider sense and tends to continually place the edge $36_2$ of the plate 36 in an inclined position between the two guiding means 20 and 21, in such a way as when the carriage travels according to the arrow F, each mouth 2, by thrusting against the edge $36_2$ of the plate 36, teends to push away the said plate until it escapes, the said plate 36 constituting at this time, by its end $36_3$, an abutment which prevents the carriage from going backwards.

This device works as follows:

When the carriage 3 reaches a mouth, it is guided and put in line by the lateral guiding plates 20 and 21, then the mouth 2 involved pushes the plate 36 away by contacting its edge $36_2$ and, at the same time, the said mouth 2 progressively compresses the spring 35 of the retractable rear abutment 26, 27, 30, 31 which is locked in place until the limit switch $F_1$ (FIG. 3) is actuated by the mouth 2 and through the the switch actuating arm 38. At that time, the mouth 2 is then positioned in such a way as (see particularly FIG. 3) the blade 36 is projecting again inside the channel formed by the guiding elements 20 and 21, in order to block and position the carriage thus preventing the latter from going backwards improperly, while at the same time the spring 35 is compressed so as to avoid, in co-operation with the paddle 27, any forwards travelling of the carriage.

At this stage, the mouth 2 involved is correctly aligned vertical with respect to the nozzle 16, and so, when the motor MC (FIG. 1) drives the said nozzle 16 down by means of the pinion gear 14 and the toothed-rack 15, the connector (coupling device) 17 of this nozzle connects with the mouth 2 so as to initiate watering.

However, at the end of the descending motion of the nozzle 16, the wedge 34 (FIG. 4), provided at the side of the connector 17 comes into contact with the bent end 32 of the rod 31, so that the other end of this rod is withdrawn from the aperture 30 of the hub 26. As soon as the end of the rod has left the aperture 30, the spring 35, previously compressed, makes the paddle 27 pivot in the clockwise direction in opposition to the return-spring 29, so that, as soon as the carriage is positioned in relation to the mouth 2 by means of the connector 17, the rear abutment 26, 27 is unlocked and remains such because, the aperture 30 is no longer facing the end of the rod 31.

Watering is then performed till the motor MC, energized in the opposite direction, initiates the upward motion of the nozzle 16 to separate the connector 17 from the mouth 2 and to release the rod 31, 32. The latter then touches, by its end, to the peripheral portion of the hub 26, but does not iniate the locking of the said rear abutment, since the aperture 30 is offset with respect to the end of the rod. Thereby, when the motor MA is energized again, the carriage 3 travels in the sense of the arrow F by pushing away again, through the spring 35, both the paddle 27 and the hub 26. When the spring 35, from the further forward motion of the mouth 2, escapes the latter, the return-spring 29 immediately brings both the hub 26 and the paddle 27 to their former positions which causes the rod 31 to enter under the action of the spring 33, into the perforation 30 of the hub 26. At this stage, the rear abutment 26, 27 has returned to its former locked position and will thus constitute a rigid rear abutment for fixing in position the next mouth 2 when the carriage 3 arrives at its station.

Figure 5:
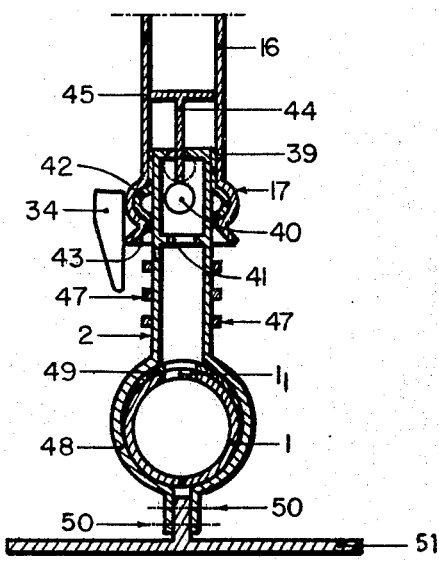
FIG. 5 is a transversal cross-section view from a water feeding pipe located at the same level as that of a water outlet mouth, the connector of the water ejecting nozzle of the carriage being meshed with the said mouth.

The construction of both the mouth 2 and of the connector 17 is presented with more details in FIG. 5.

In this Figure, it can be seen that the mouth 2 consists of a tube provided at its upper end with an aperture 39 normally obturated by a ball 40, which is raised against the said aperture 39 by means of the water pressure available in the tube 1. On the inside wall of the tube which constitutes the mouth 2, a ring-shaped groove 41, or the like, is also provided which is a stopping means for the ball 40, thus preventing the latter from falling down into the tube 1 when there is no water pressure inside the pipe.

The connector 17 of the nozzle 16 comprises a ring-shaped inside groove, inside which a U-shaped joint 42 is embedded the lips of which press against the external wall of the mouth 2 when the connection is performed. Also, the lower end of the connector 17 comprises a wide-mouthed portion 43 which makes easier guiding of the connector 17 when connecting with the mouth 2.

The mechanism ensuring opening of the mouth 2 during connection consists of a rod 44 secured in the axis of the connector 17 by means of a transverse rod 45, which is itself secured inside the nozzle 16.

It can then be seen that, when the nozzle 16 moves down, the lower end of the rod 44 pushes the ball 40 away whilst the connector 17, by means of its joint 42, is connected to the mouth 2.

There can also be seen on the external wall of the mouth 2, several ring-shaped grooves 47, under one of which the end $36_3$ of the blade 36 will be embedded. The said end $36_3$ has the same shape as that of the mouth 2, i.e., in the example represented, it is arc-shaped. Then, when the end $36_3$ of the paddle 36 is meshed beneath one of the grooves 47, the carriage is secured in the vertical direction in relation to the mouth 2, so that the pressure of the water brought into the nozzle 16 cannot separate the latter from the mouth 2 with which it is connected.

It will be seen in FIG. 5 that the mouth 2 is secured on the tube 1, at the same position as its opening $1_1$, by means of a ring 48 by way of a gasket 49 ensuring tightness between the tube 1 and the mouth 2. The ring 48 is tightened around the tube 1 by means of screws or bolts arranged at 50; these screws 50 also ensure fixing, with respect to the tube 1, of a section 51 arranged transverse in relation to the axis of the tube 1, the said section being intended for ensuring a good stability to the assembly and maintaining the mouth 2 in a vertical position with respect to the ground.

Figure 6:
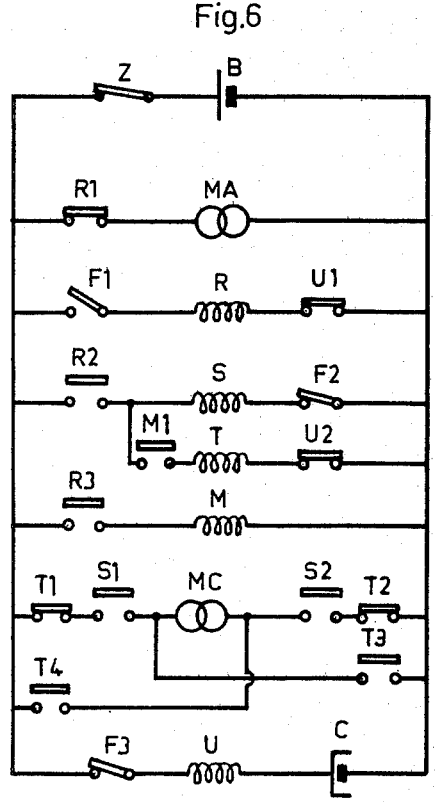
FIG. 6 shows the electric diagram of the device of the invention.

The electric circuit ensuring the automatic working of the installation in combination with the mechanical devices already described, is shown in FIG. 6.

It can be seen from this diagram that, when the installation is placed under voltage by closing the switch Z, the motor MA intended for driving the carriage is also placed under voltage, and the said carriage thus moves towards a mouth 2. When the carriage reaches a mouth, it is stopped mechanically by the blade 36 and the paddle 27, as already described but, simultaneously, the end-of-course switch F1 is actuated, which places the relay R under voltage. Feeding this relay R causes, by opening its contact R1, interruption of the feeding of the motor MA for stopping the carriage, and by actuating its contact R2, putting the relay S under voltage, the said relay S ensuring in turn, by actuating its contacts $S_1$ and $S_2$, putting under voltage of the motor MC which operates the downward motion of the nozzle 16. As soon as the nozzle has reached its lower position, watering starts, and the ramp 19 of the toothed-rack 15 operates the limit switch F2, so as to interrupt feeding of the relay S, and then to interrupt feeding of the motor MC by means of its contacts $S_1$ and $S_2$.

Also, when the relay R is put under voltage by closing the end of course switch F1, the contact R3 of the said relay R is also closed, which entails putting under voltage of the automatic time-switch M.

Watering of the area surrounding the carriage is then performed during an adjustable time until the contact M1 of the automatic time-switch M closes for putting the relay T under voltage. As soon as the relay T is under voltage, is contacts $T_1$ and $T_2$ get opened whilst its contacts $T_3$ and $T_4$ get closed, which initiates feeding of the motor MC in the opposite direction than previously, so as to perform raising of the nozzle 16 through the pinion gear 14 and the toothed-rack 15. The nozzle 16 is thus raised until the ramp 18 actuates the end of course switch F3 which places under voltage the relay U arranged in series with the condenser C. This relay U remains thereby normally fed as long as a current can pass through it, i.e. as long as the condenser C is not completely charged. During the time required for normally feeding the relay U, the contacts $U_1$ and $U_2$ get opened in such a way that the contact $U_2$ cuts feeding of the relay T, in order to stop feeding of the motor MC by means of the contacts $T_3$, $T_4$, while opening of the contact U1 cuts feeding of the relay R, so as to feed the forward motion motor MA again, by closing the contact R1.

The time normally required for feeding the said relay U is determined by the value of the condenser C, and is calculated as a function of the opening time of the contact U1, which puts the motor MA under voltage, so that the said opening time of the contact U1 is sufficient for keeping the end of course contact F1 opened for starting the travelling of the carriage and, then, to allow the escape of the contact blade 38 of the mouth 2, before the contact U1 closes again.

As a matter of fact, when the carriage has left the mouth involved, the blade 38 is released for opening again the end of course switch F1, which prevents feeding of the relay R and thus maintains the motor MA under voltage by means of the contact R1.

Figure 9:
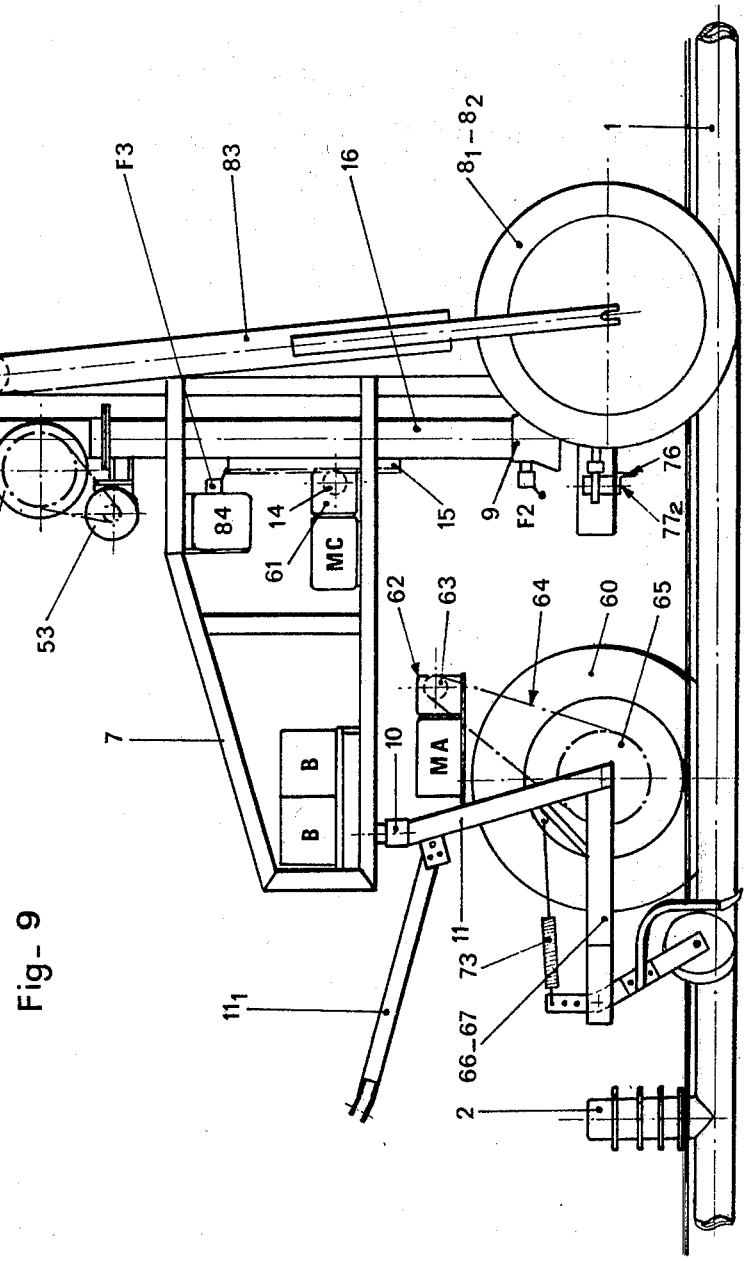
FIG. 9 is a diagrammatical lateral view of the watering installation, comprising the carriage positioned on its stationary water circuit.
Figure 10:
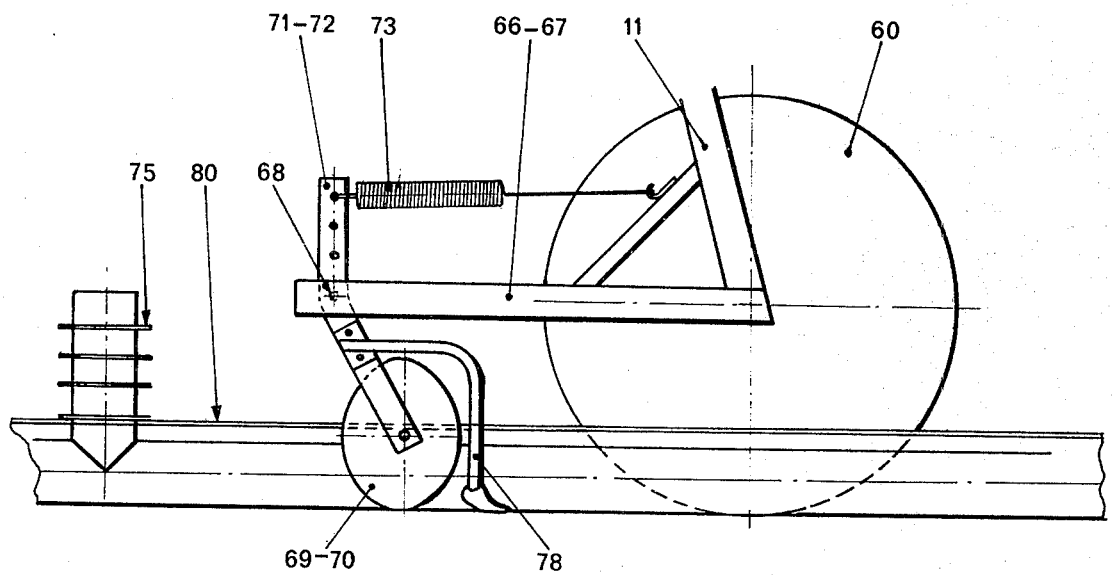
FIG. 10 is a partial view particularly showing the guide-rollers of the carriage.
Figure 11:
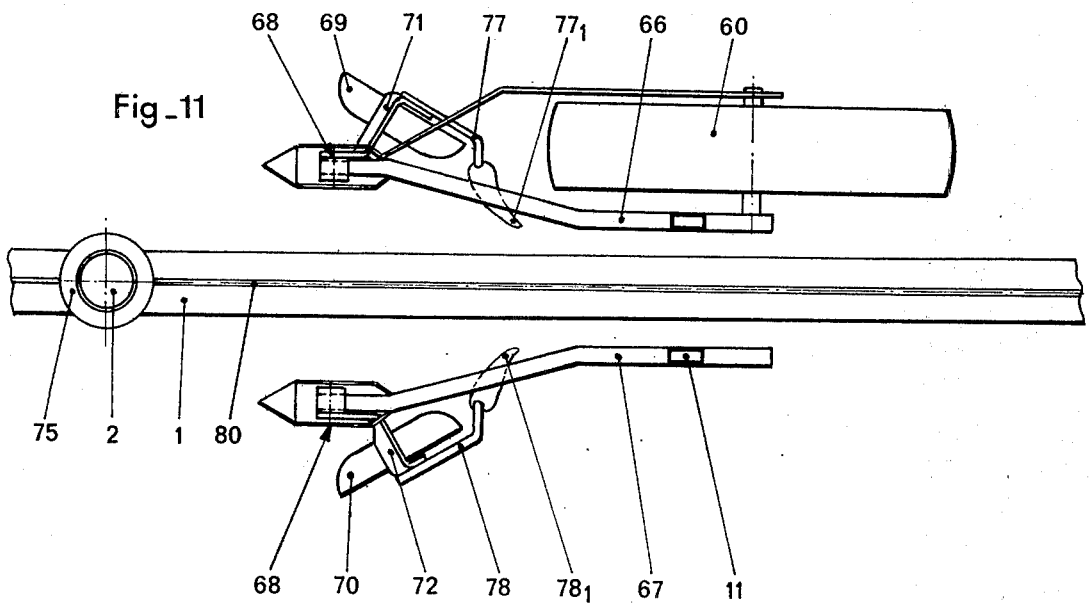
FIG. 11 is a partial view showing another mode of embodiment of the guiding means of the carriage.

The watering installation shown in FIGS. 9 to 11, also comprises a framework 7, mounted on two supporting wheels $8_1$ and $8_2$ and a driving wheel 60. This carriage travels along a stationary water circuit comprising a tube 1 provided with mouths 2, regularly distributed, onto which are sucessively coupled the connector 9 of a nozzle 16, vertically movable on the carriage by an electric motor MC, a speed-reducer 61, and a pinion 14 meshing with a toothed-rack 15, integral with the said nozzle 16. Stoppage of the nozzle 16 at its high and low positions is obtained by end of course switches F3 and F2 respectively, while travelling of the carriage is obtained by means of an electric motor MA.

This driving electric motor MA is, to this end, connected to a speed-reducing gear 62 provided with an outlet pinion 63 which drives, by means of a chain 64, the pinion 65 mounted integral with the driving wheel 69, arranged lateral with respect to the tube 1.

The driving wheel 60, as well as the nozzle 16, are driven in motion by means of the electric motors MA and MC, themselves supplied from batteries B. Furthermore, these batteries are kept charged by the turbine 52 (FIG. 9) which is driven in rotation during stopping of the carriage on a mouth 2, by the pressure of the watering water which passes through the nozzle 16. This turbine 52 then drives the alternator 53, thus performing recharge of the batteries B during each stopping of the carriage, these batteries being used for driving the carriage by means of the driving wheel 60 and being used for driving the nozzle 16 downwardly and upwardly for coupling the nozzle to and uncoupling it from the water outlet mouth 2.

Therefore, it can be seen that in this construction of the watering installation shown in FIG. 9, the watering water, during the watering operation, is used for accumulating power which is deferred with respect to the consumption of the said power which occurs when the carriage passes from a watering mouth to the next one. These deferred accumulations and consumptions are alternated within the continuous working cycle of the installation in order to ensure the independent working of the installation due to the fact that the batteries B are kept charged.

Also in this construction, the automatic working cycle is performed through relays and an electronic box 84 provided on the frame work 7.

The installation in accordance with the invention, thus constitutes an assembly entirely independent which works without any manual interference, during a whole season which requires watering for ensuring a maximum growth of plants.

The support 11 of the sole driving wheel 60 is mounted pivoting, at 10, on the frame-work 7, and comprises a coupling arm $11_1$ as well as means ensuring the co-operation of the wheel with the pipe.

These means (FIGS. 10 and 11) consist of two arms 66 and 67, which receive, on transversal axes 68, pivoting supports 71 and 72 for rollers 69, 70.

These arms 66 and 67 are directed towards the front of the carriage and placed before the driving wheel 60.

The forward end of these arms 66 and 67 bears the rollers 69 and 70 which comprise a convex periphery, said rollers being arranged oblique so as to form a V open in the travelling direction of the carriage, and in order to facilitate guiding of the latter.

Abutment means, as well as return-springs 73, are provided in order to limit the pivoting movement of the supports 71 and 72, and also in order to keep the rollers 69 and 70 permanently applied on the ground.

It can then be seen that, in the construction described, the rollers 60 and 70 are positioned ahead of the front wheel 60, which is also the driving wheel, so as to guide correctly the carriage, each of the arms 66 and 67 furthermore constituting guiding means for the carriage when they co-operate with the mouths 2.

Also, in order to allow each connector 9 to be correctly positioned on each mouth 2, each of these mouths is provided with superposed ring-shaped grooves 75, very little spaced from each other, so that any one of them might co-operate with a couple of paddles 76 (FIG. 9) which pivot according to the vertical axes $77_2$, and this so as to take into account the differences in height of the pipe 1 with respect to the carriage, and to thus ensure a correct connection of the connector 9 to each mouth 2.

It has also be provided, according to the invention, to put all or a part of the pipe 1 underground, so that only the mouths 2 protrude for allowing the connector 9 to connect the nozzle 16.

To this end, and for ensuring a continuous guiding of the carriage, it has been provided to arrange on each of the supports 71 and 72 a rod 77 and 78, which is bent in such a way as its lower end is at the level of the ground and directed towards the tube 1 slightly at the rear of the carriage, as it is shown in FIG. 11. Furthermore, in the example shown, each rod is provided at its end with a paddle $77_1$ and $78_1$. These rods 77, 78 and these paddles $77_1$ and $78_1$ are intended for co-operating with a cable 80, tightened for example between the mouths 2 of the pipe 1 underground, in order to ensure guiding of the carriage.

Thus, if for any reason the pipe 1 must be put underground, guiding of the carriage by means of the rollers 69 and 70 can be easily replaced by a guiding ensured by the cable 80 tightened between two mouths.

Also, guiding can be obtained by means of forks, not shown, which cross each other and pivot when they come to the height of a mouth. After they pass by a mouth said forks will return to their former position thanks to the springs, by surrounding the cable 20 which thus cannot escape.

The carriage according to the invention, provided with its front end driving wheels 60, and with its two rear carrying wheels $8_1$ and $8_2$, is constructed so that it can travel across high-leveled cultivations, row-arranged, for instance across a field of corn.

To this end, each of the wheels $8_1$ and $8_2$ is fitted to the sections 83 which form, on each side of the frame work 7, constructions having the shape of a reversed U whose basis 84 is located at a higher level than that of the framework 7. Thereby, the pipe 1 and the front wheel 60 together with its rollers 69, 70 can be placed between two lines of a cultivated field, while the two other wheels $8_1$ and $8_2$ can be arranged in the close interlines without spoiling the crop by the passage of the carriage. Also, such a construction makes possible to give a relatively great length to the section 83, so that the carriage can travel across high-leveled cultivations such as corn, without reducing so far its stability.

Figure 12:
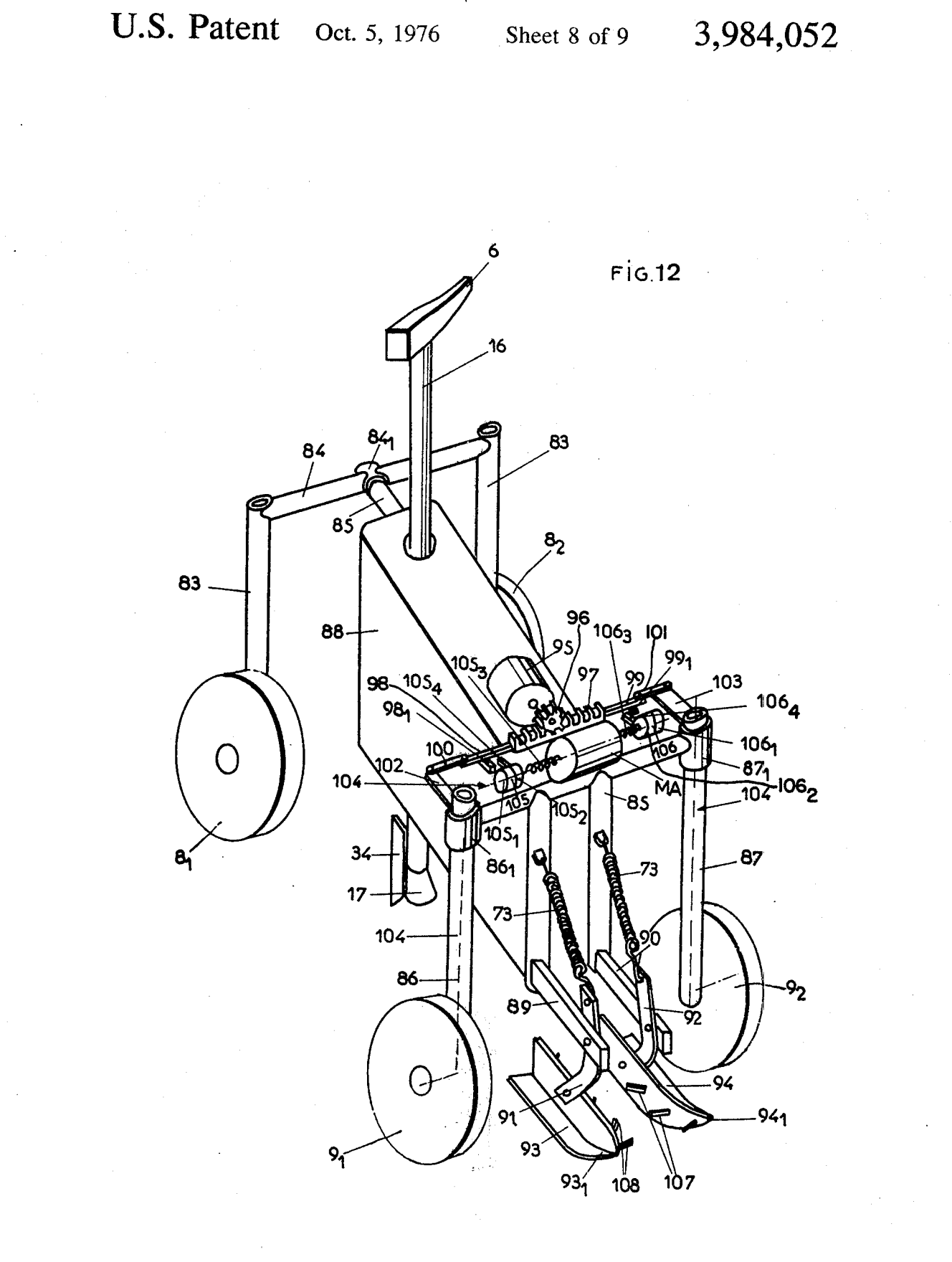
Figure 13:
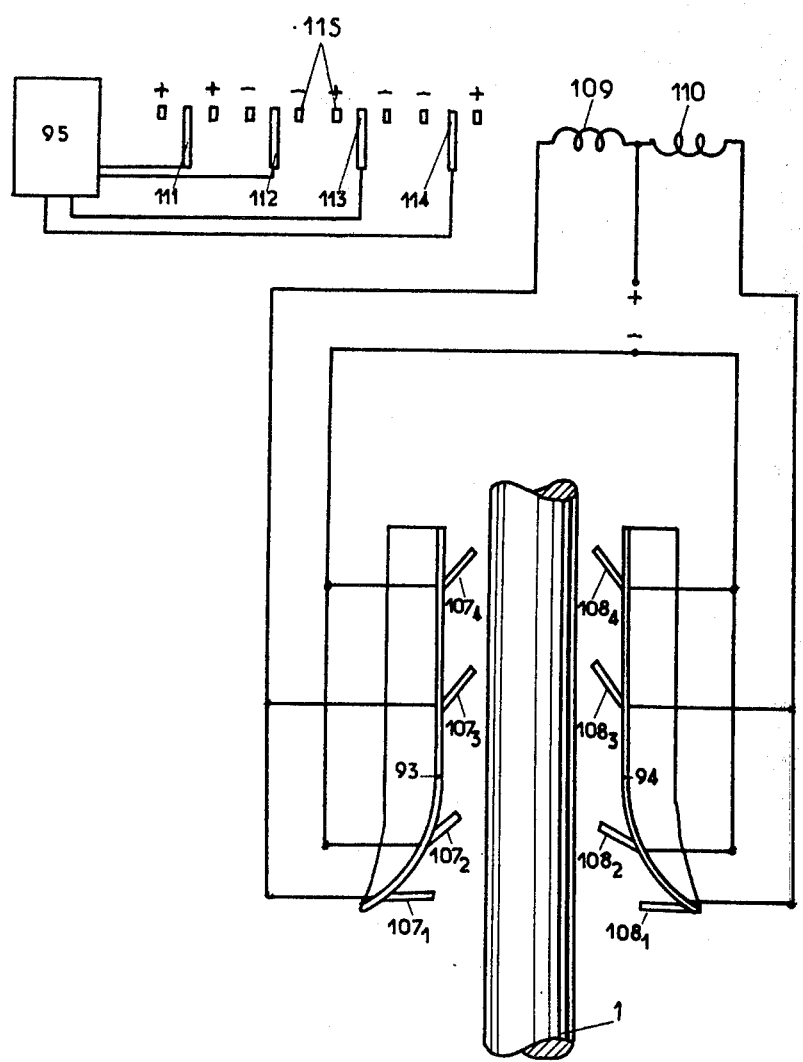
FIG. 13 shows the electric diagram of the driving means of the motor which guides the carriage.

According to the mode of embodiment shown in FIGS. 12 and 13, it can be seen that the carriage of the watering installation (FIG. 1), comprises a framework 85 provided at its rear part with a structure in the shape of a reversed U 83, 84, which receives the two wheels $8_1$ and $8_2$, while two front wheels $9_1$ and $9_2$ are mounted at the end of hollow tubes 86 and 87 onto the framework 85.

Both 86 and 87 which support the front wheels $9_1$ and $9_2$ then also constitute a U-shaped structure with the frame work of the apparatus the central part of which is occupied by a cart or carrier 88 containing the whole of both the electric and mechanic systems which ensure the independent working of the carriage.

The carriage described is then an overlapping vehicle, in view of the fact that the connector 17 co-operates with the tube arranged between two rows of cultivation, while the wheels $8_1$, $9_1$, on the one hand, and $8_2$, $9_2$, on the other, travel between the rows of the close cultivations, this in order to prevent the water which flows along the central row when the pipe is raised to interfere with travelling of the wheels which, themselves, travel along the close rows.

Besides, the transverse element 84 of the U-shaped structure at the rear is mounted pivoting at $84_1$ onto the framework of the carriage, this in order to allow the latter to normally travel across cultivations made on inclined grounds.

The front part of the carriage comprises two horizontal arms 89 and 90 which support two pivoting levers 91 and 92, onto which the springs 73 are fitted.

The lower end of these levers 91 and 92 also receives pivoting track-links 93 and 94, whose front ends $93_1$ and $94_1$ are diverging from from each other, while they are raised, as it is shown in FIG. 12.

Pivoting of the hollow tubes 86 and 87, for ensuring pivoting of the wheels $9_1$ and $9_2$, is performed by an electric motor 95 the outlet shaft of which is provided with a pinion 96, which co-operates with a toothed-rack 97 which moves transversally with respect to the carriage. The ends of this toothed-rack 97 are connected, by rods 98 and 99 and small rods 100 and 101, to said arms 102, 103 fitted to the upper end of the tubes 86 and 87.

Then it can be understood that by driving in rotation the motor 95 in either direction, the toothed-rack is displaced so as to make the tubes 86 and 87 pivot for guiding the carriage along curves.

On the other hand, in the example shown, the front wheels $9_1$ and $9_2$ are also the driving wheels, their driving being ensured by the motor MA and a transmission 104, shown in dotted lines in FIG. 12, which is arranged inside the vertical tubes 86 and 87, and which comprises appropriated universal-joints and mitre gears.

This mechanical transmission which actuates the wheels comprises, on each side of the motor MA, disengaging devices 105, 106, consisting for example of dog-clutches a part of which, $105_1$, $106_1$ is integral with the portion of the transmission 104, connected to the wheels $9_1$, $9_2$, and the other portion of which $105_2$, $106_2$, moves axially in opposition to the return-springs $105_3$, $106_3$.

These disengaging devices 105, 106 which respectively ensure disengaging of the wheels $9_1$ and $9_2$, are actuated by the system of rods $98_1$, $99_1$ arranged at the ends of the toothed-rack 97.

As a matter of fact, the movable parts $105_2$ and $106_2$ each comprises a driving finger $105_4$ $106_4$ with which other fingers $98_1$ and $99_1$ respectively co-operate and which are provided on the rods 98 and 99.

It can then be understood that, when the toothed-rack 97 moves from the left to the right as shown in FIG. 12, so as to steer the wheels $9_1$ and $9_2$ in rotation from the left to the right, the finger $98_1$ moves off from the finger $105_4$ and thus maintains the wheel $9_1$ engaged while, on the other hand, the finger $99_1$ comes close to the finger $106_4$ so as to separate the two parts $106_1$ and $106_2$ from the engaging device 106, which causes disengagement of the driving of the wheel $9_2$.

It can therefore be seen in that construction that the wheel which is inside a curve is not driven in motion while, on the other hand, that which is outside a curve is still acting as a driving wheel.

The direction motor 95 is fed from flexible contact blades 107 and 108 arranged on the internal side of the track-links 93 and 94.

The diagram showing the electric circuits is shown in FIG. 13. In this Figure, there can be seen both the water feeding metallic pipe 1 of the installation, and the track-links 93 and 94 which straddle it.

In the example represented, each track-link comprises four driving blades $107_1$ to $107_4$, and $108_1$ to $108_4$, which are carfully insulated from the track-links themselves, to the extent the latter are made of a conducting material.

Power feeding of the motor 95 is ensured by relays, and in the example represented the relay used is a relay with two reversing contacts and with a central positin at rest which comprises, to this end, two coils 109 and 110 and four contact movable blades 111 to 114, each co-operating with two contact studs 115, connected to the battery which provides electric power with the polarities such as those shown in FIG. 13.

In the circuit diagram shown in FIG. 13, it is to be understood that the motor 95 has an armature and a field, the armature being connected to the relay contacts 111 and 112 and the field being connected to the relay contacts 113 and 114.

According to the invention, the motor 95 is fed so as to make it rotate in a way as soon as two flexible blades, fitted onto one and the same track-link, come into contact with the water feeding, metallic tube 1, the metal of the tube then completing the feeding series circuit of the coils 109 or 110 by the battery B.

As a matter of fact, due to the alternated connection of the conducting blades of one and the same track-link, and due to the shape of the latter, it is quite apparent that when the two blades come into contact with the tube, one of the coils of the relay will be put under voltage.

Thus, for example, if the blades $107_1$ and $107_3$ come into contact with the tube 1, they will not put by themselves the coil 109 under voltage but, in this case, the blade $107_2$ which is located between the two precedent ones is also in contact with the tube 1, and thereby the electric circuit is then well completed.

However, it will be noted that in the mode of embodiment shown in FIG. 12 the mode of transmission and driving between the electric motors 95 and MA and the front end driving wheels $9_1$ and $9_2$ can be different from each other, the main thing being that the motor 95, which ensures steering of the wheels, also co-operates with engaging means which stop driving in rotation of the wheel located inside the curve followed by the carriage.

Of course, the invention is not limited to the modes of embodiment represented and described hereabove, from which other modes and methods of embodiment can be provided without, thereby, departing from the scope of the invention.

What we claim is:

1. A watering installation, wherein there is a movable carriage provided with at least a motor element, at least a front wheel and at least a nozzle for throwing water, said nozzle being connected to a coupling device on said carriage for coupling the nozzle in sequence to a plurality of water outlet mouths incorporated in a stationary water circuit which includes a water supply pipe provided with said outlet mouths distributed at spaced points along its length, and said carriage comprising guide means for guiding the carriage to follow along with respect to said pipe, retractable abutment means mounted on said carriage in a location near to said pipe, said retractable abutment means being positionable into a first position on said carriage for bumping against each of said mouths for stopping the carriage with said coupling device in alignment with the respective mouths, operating means on the carriage for moving said coupling device into coupling relationship with the aligned mouth, and actuating means on the carriage for causing said operating means to move said coupling device into engagement with said aligned outlet mouth, holding means for temporarily holding the abutment means in said first position for bumping against the respective outlet mouths, said coupling device including release means for releasing said holding means as soon as said coupling device has become engaged with the aligned outlet mouth, said abutment means having a return spring associated therewith for returning said abutment means to said first position, and said abutment means including flexible means which is put under stress when said abutment means bumps against the respective mouths, said stressed flexible means moving said abutment means to a retracted position against the force of said return spring as soon as said holding means has been released, and said holding means being incapable of holding said abutment means in said retracted position.

2. A watering installation as claimed in claim 1, in which said retractable abutment means is pivotally mounted on said carriage for swinging movement between said first position and said retracted position, said flexible means being a compression spring secured to said pivoted abutment means and adapted to bump against the respective mouths, said holding means comprising a movable finger engageable with said pivoted abutment means when in said first position for holding the abutment means in said first position, and said release means being a wedge for moving said finger out of engagement with said abutment means as soon as said coupling device has become engaged with the aligned outlet mouth.

3. A watering installation as claimed in claim 1, in which said motor element for moving the carriage and said operating means for moving said coupling device are electric motors energized by battery means mounted on the carriage, a re-charging device associated with said battery means for re-charging said battery means, and a turbine driven by the watering weater for driving said re-charging device.

4. A watering installation, wherein there is a movable carriage provided with at least a motor element, at least a front wheel and at least a nozzle for throwing water, said nozzle being connected to a coupling device on said carriage for coupling the nozzle in sequence to a plurality of water outlet mouths incorporated in a stationary water circuit which includes a water supply pipe provided with said outlet mouths distributed at spaced points along its length, and said carriage comprising guide means for guiding the carriage to follow along with respect to said pipe, retractable abutment means mounted on said carriage in a location near to said pipe, said retractable abutment means being held in a first position on said carriage for bumping against each of said mouths for stopping the carriage with said coupling device in alignment with the respective mouths, operating means on the carriage for moving said coupling device into coupling relationship with the aligned mouth, and acutating means on the carriage for causing said operating means to move said coupling device into engagement with said aligned outlet mouth and for releasing said abutment means for movement into a retractable second position, said water supply pipe being distributed on the area to be watered, and said pipe having its ends connected together for defining a closed circuit along which the carriage is guided.

5. A watering installation as claimed in claim 4, in which there is a main conduit for feeding water to said supply pipe, said main conduit being connected to said supply pipe at a plurality of points along said closed circuit for introducing water into said closed circuit at said plurality of points, whereby the water in said closed circuit can flow in both directions therethrough to the outlet mouth to which the coupling device on the carriage has become engaged.

6. A watering installation as claimed in claim 4, in which said carriage includes two front wheels for driving the carriage, said front wheels being parallel with each other and being spaced apart slightly greater than the width of said pipe for straddling said pipe for guiding the carriage, and two rear wheels spaced widely apart relative to said front wheels for supporting the carriage.

7. A watering installation as claimed in claim 4, in which said carriage includes two rear wheels spaced apart for supporting the carriage and at least one front driving wheel, said front wheel being mounted on an upwardly extending support, said support being pivotally connected to a forwardly extending portion of the carriage, arm means connected to said support and extending forwardly ahead of said front wheel, and a pair of guide elements positioned on said arm means for straddling said water pipe in guiding relationship for said front wheel support, thereby to steer the carriage by guiding the driving front wheel.

8. A watering installation as claimed in claim 7, in which said pair of guide elements comprise rotatably mounted rollers having convex perimeters, said rollers each being positioned obliquely on said arm means with the perimeters of said rollers being more widely spaced apart at the front than at the rear for defining a V pattern open toward the front of the carriage for steering the carriage.

9. A watering installation as claimed in claim 7, in which said pair of guide elements comprise a pair of paddle elements whose free ends are located substantially at ground level, said paddle elements each being directed inwardly and rearwardly for converging in a rearward direction for steering.

10. A watering installation as claimed in claim 9, in which said paddle elements are pivotally mounted on said arm means for swinging upwardly and downwardly, and spring means for urging the free ends of said paddle elements downwardly toward the ground.

11. A watering installation as claimed in claim 4, in which said carriage includes two rear wheels for supporting the carriage and at least one front driving wheel, said front wheel being mounted on a support pivotally mounted on a front portion of the carriage, arm means extending forward ahead of said front wheels, a pair of guide elements mounted on said arm means for straddling said water pipe in guiding relationship for said carriage for guiding the carriage along said pipe.

12. A watering installation as claimed in claim 11, in which said pair of guide elements are a pair of guide shoes positionable on opposite sides of said water pipe, each of said guide shoes being provided with a plurality of electrical contacts, said contacts being in circuit with an electric motor connected by a mechanical steering linkage with said pivoted support for turning said support for steering the front driving wheel.

13. A watering installation as claimed in claim 12, in which said guide shoes are swingably mounted on said arm means for up and down movement and spring means urging said guide shoes downwardly toward the ground.

14. A watering installation as claimed in claim 12, in which said plurality of contacts comprise at least a pair of flexible blades located on each side of the water pipe, said pairs of blades being electrically conductive and being insulated from said guide shoes and being connected in circuit in series relationship with a relay, said water pipe being formed of electrically conductive material, and said circuit being completed when either pair of blades come into contact with the conductive pipe.

15. A watering installation as claimed in claim 12, in which said plurality of contacts comprise at least four flexible blades located on each side of the water pipe, said four blades being electrically insulated from said guide shoes, the first and third of said blades and the second and fourth of said blades being electrically connected together.

16. A watering installation, wherein there is a movable carriage provided with at least a motor element, at least a front wheel and at least a nozzle for throwing water, said nozzle being connected to a coupling device on said carriage for coupling the nozzle in sequence to a plurality of water outlet mouths incorporated in a stationary water circuit which includes a water supply pipe provided with said outlet mouths distributed at spaced points along its length, and said carriage comprising guide means for guiding the carriage to follow along with respect to said pipe, retractable abutment means mounted on said carriage in a location near to said pipe, said retractable abutment means being locked in a fixed position on said carriage for bumping against each of said mouths for stopping the carriage with said coupling device in alignment with the respective mouths, operating means on the carriage for moving said coupling device into coupling relationship with the aligned mouth, and actuating means on the carriage for causing said operating means to move said coupling device into engagement with said aligned outlet mouth, said nozzle being mounted vertically on the carriage and having water spray jet means at its upper end and having said coupling device at its lower end, said nozzle being movable up and down on said carriage, said operating means being arranged for moving said nozzle up and down on said carriage, and said actuating means causing the unlocking of said abutment means when said coupling device is moved into engagement with said outlet mouth for allowing the carriage again to proceed when said coupling device has been uncoupled from the outlet mouth.

17. An automatic watering installation for watering an area of ground comprising a water supply pipe distributed on the area to be watered and being arranged in an endless loop for providing a closed circuit along which the carriage is guided, said water supply pipe having outlet mouths at spaced points therealong, a self-propelled watering carriage for watering said area of ground, said carriage having a plurality of wheels, two of said wheels being a pair or rear wheels straddling said water supply pipe for travelling along the water supply pipe from one of said outlet mouths to another, at least one of said wheels being a front wheel which is steerable, nozzle means for spraying water, coupling means connected to said nozzle means for engaging with the respective outlet mouths for feeding water from the outlet mouth to said nozzle means for watering the ground, operating means for engaging and disengaging the coupling means with the respective outlet mouths, guide means at the front of the carriage for steering the front wheel for guiding the carriage to follow along said closed circuit, retractable abutment means mounted near the rear of said carriage midway between and near said rear wheels, said abutment means being mounted in a location near to said pipe, said coupling means also being mounted near the rear of said carriage midway between and near said rear wheels, locking means for locking said abutment means in an extended position for bumping against each of said mouths for positively stopping said carriage with said coupling means in alignment with the respective mouths, retaining means on the carriage engageable with the respective mouths for preventing the carriage from moving backwards, operating means on the carriage for engaging and disengaging the coupling means with the aligned mouth, actuating means on the carriage for causing said operating means to move and said coupling means into engagement with the aligned mouth, means for unlocking said locking means for allowing retraction of said abutment means, said operating means for engaging and disengaging said coupling means including a first electric motor for moving said coupling means down or up on the carriage, a second electric motor on the carriage for driving it along said closed circuit from one outlet mouth to the next, a battery on the carriage for energizing said motors, and switch means for deenergizing the second motor during the time that the coupling means is engaged with the aligned mouth.

18. An installation according to claim 17, wherein the battery is associated with a recharging device comprising a turbine driven by the watering water.

19. A watering installation as claimed in claim 17, in which said actuating means on the carriage includes a first switch for deenergizing the carriage drive motor, said switch being arranged on the carriage to cooperate with the respective outlet mouths for stopping the carriage drive.

20. A watering installation as claimed in claim 19, in which second and third switches are positioned on said carriage arranged to be actuated by the up and down movement of said coupling means, said second switch being arranged to be actuated when said coupling means has been moved down to bring said coupling means into engagement with the aligned outlet mouth, said second switch having an automatic timer in circuit therewith for energizing the first drive motor to raise the coupling means after the desired timed period has elapsed, and said third switch being arranged to be actuated when the coupling means has been raised to its up position for energizing the carriage drive motor to commence forward travel of the carriage.

21. A watering installation as claimed in claim 20, in which said third switch serves to energize the carriage driving motor through a relay in series with a condenser for maintaining the relay active during a brief time period which the carriage commences moving away from the outlet mouth with which it was most recently aligned.

22. A watering installation as claimed in claim 21, in which said operating means for moving thee coupling means up and down includes a toothed rack extending vertically connected to said coupling means and driven by a pinion gear.

23. A watering installation, wherein there is a movable carriage provided with at least a motor element, at least a front wheel and at least a nozzle for throwing water, said nozzle being connected to a coupling device on said carriage for coupling the nozzle in sequence to a plurality of water outlet mouths incorporated in a stationary water circuit which includes a water supply pipe provided with said outlet mouths distributed at spaced points along its length, and said carriage comprising guide means for guiding the carriage to follow along with respect to said pipe, retractable abutment means mounted on said carriage in a locatin near to said pipe, said retractable abutment means being lockable in a fixed position on said carriage for bumping against each of said mouths for stopping the carriage with said coupling device in alignment with the respective mouths, operating means on the carriage for moving said coupling device into coupling relationship with the aligned mouth, a blade pivotally mounted on the carriage, a return spring associated with said blade for holding it in an extended position with one of its edges in an inclined position with respect to the respective outlet mouths for coming in contact with an approaching one of said outlet mouths, whereby the pressure of the approaching outlet mouth against said inclined edge serves to depress the blade against the force of its return spring, said blade returing to its extended position behind the outlet for retaining the outlet against said abutment means, and actuating means on the carriage for causing said operating means to move said coupling device into engagement with said aligned outlet mouth and for causing said abutment means to become unlocked when said coupling device has engaged said mouth.

24. A watering installation as claimed in claim 23 in which said pivoted blade has a recess at its free end shaped to conform to the side of the outlet mouth for preventing the carriage from moving backwards after the coupling device has come into alignment with the outlet mouth.

25. A watering installation as claimed in claim 24 in which each of said outlet mouths has external grooves thereon, said pivoted blade being engageable with one of said gooves for securing the carriage to the outlet mouth to prevent vertical movement with respect thereto for preventing the pressure of the water issuing out of said outlet mouth from vertically dislodging the carriage.

26. A self-propelled watering carriage for use in an installation for watering an area of ground wherein a plurality of water supply outlet mouths are distributed at spaced points over said area, said carriage comprising a plurality of wheels for travelling from one of said outlet mouths to another in sequence, nozzle means for spraying water, coupling means connected to said nozzle means for engaging with the respective outlet mouths for feeding water from the outlet mouth to said nozzle means for watering the ground, operating means for engaging and disengaging the coupling means with the respective outlet mouths, an electric motor on the carriage for driving it from one outlet mouth to the next; a re-chargeable battery for energizing said motor, switch means on the carriage for shutting off the motor during the time while the coupling means is receiving water from the respective outlet mouth, turbine means on the carriage arranged to be driven by the water being fed from the coupling means to said nozzle means, and electrical generating means driven by said turbine means and electrically connected to said battery for re-charging the battery, whereby the battery is re-charged during the time period while the stationary carriage is watering the ground.

27. A watering installation as claimed in claim 26, in which a limit switch is arranged on the carriage to be actuated by the respective outlet mouth when the coupling means comes into alignment above the outlet mouth, said limit switch being included in circuit with a relay having a first relay-controlled contact in series with the carriage drive motor for controlling the energization thereof, said relay having a second relay-controlled contact in series with a second relay which serves to control the first motor, and said relay having a third relay-controlled contact for controlling an automatic electric timer which serves to energize the first motor after a desired time period, thereby to raise the coupling means afgter the desired watering time period has elapsed.

* * * * *